(12) United States Patent
Ng et al.

(10) Patent No.: US 10,578,417 B2
(45) Date of Patent: Mar. 3, 2020

(54) METHOD OF MEASURING FAN BLADE PICTURE FRAME WIDTH

(71) Applicant: ROLLS-ROYCE plc, London (GB)

(72) Inventors: Wu Xin Charles Ng, Singapore (SG); Wei Hock Teh, Singapore (SG); Shao Chun Ye, Singapore (SG); Kevin Hau-Kong Chan, Singapore (SG)

(73) Assignee: ROLLS-ROYCE plc, London (GB)

( * ) Notice: Subject to any disclaimer, the term of this patent is extended or adjusted under 35 U.S.C. 154(b) by 228 days.

(21) Appl. No.: 15/865,546

(22) Filed: Jan. 9, 2018

(65) Prior Publication Data

US 2018/0209774 A1 Jul. 26, 2018

(30) Foreign Application Priority Data

Jan. 12, 2017 (GB) .................................. 1700534.9

(51) Int. Cl.
| | | |
|---|---|---|
| *G01B 5/02* | (2006.01) | |
| *G01B 5/20* | (2006.01) | |
| *G01B 17/06* | (2006.01) | |
| *G01B 21/04* | (2006.01) | |
| *G01B 17/00* | (2006.01) | |

(52) U.S. Cl.
CPC ............. *G01B 5/205* (2013.01); *G01B 17/00* (2013.01); *G01B 17/06* (2013.01); *G01B 21/04* (2013.01)

(58) Field of Classification Search
CPC ........................................................ G01B 5/205
USPC ............................................................ 33/551
See application file for complete search history.

(56) References Cited

U.S. PATENT DOCUMENTS

| | | | | |
|---|---|---|---|---|
| 3,464,119 A | * | 9/1969 | Griggs ....................... | B07C 5/04 33/552 |
| 3,678,736 A | | 7/1972 | May | |
| 4,322,887 A | * | 4/1982 | Burton ...................... | G01B 5/14 33/552 |
| 4,374,459 A | * | 2/1983 | Burton .................. | G01B 5/207 33/548 |
| 4,612,622 A | * | 9/1986 | May ....................... | G01B 5/012 33/501 |
| 4,896,430 A | * | 1/1990 | Burton .................. | F01D 21/003 33/552 |
| 5,475,613 A | | 12/1995 | Itoga et al. | |
| 2001/0023543 A1 | * | 9/2001 | Hastilow .................. | G01B 3/14 33/546 |

(Continued)

FOREIGN PATENT DOCUMENTS

| | | |
|---|---|---|
| GB | 2050918 | 1/1981 |
| GB | 2181241 | 4/1987 |
| WO | 2007028941 | 3/2007 |

OTHER PUBLICATIONS

European Search Report dated Mar. 13, 2018, issued in EP Patent Application No. 18151070.

(Continued)

*Primary Examiner* — George B Bennett
(74) *Attorney, Agent, or Firm* — Shumaker & Sieffert, P.A.

(57) ABSTRACT

A method of measuring the perimetric width of a hollow component. The hollow component comprises a first panel and a second panel, with the first and second panels being bonded to one another around their respective perimeters, and a perimetric width being defined as the width of the bonded portion joining the first panel to the second panel.

9 Claims, 5 Drawing Sheets

(56) References Cited

U.S. PATENT DOCUMENTS

| | | | | |
|---|---|---|---|---|
| 2005/0217131 A1* | 10/2005 | Varsell | ............... | G01B 3/14 |
| | | | | 33/562 |
| 2008/0209747 A1* | 9/2008 | Chang | ............... | G01B 5/205 |
| | | | | 33/530 |
| 2009/0030648 A1* | 1/2009 | Hunter | ............... | G01B 21/04 |
| | | | | 702/152 |
| 2010/0064537 A1* | 3/2010 | Petroskie | ............... | G01B 5/205 |
| | | | | 33/533 |
| 2015/0075265 A1* | 3/2015 | Memmer | ............... | F01D 11/14 |
| | | | | 73/112.01 |
| 2016/0102580 A1* | 4/2016 | Betancourt | ............... | F02C 3/10 |
| | | | | 60/805 |
| 2016/0201486 A1* | 7/2016 | Hartung | ............... | F01D 9/041 |
| | | | | 415/211.2 |

OTHER PUBLICATIONS

Great Britain Search Report issued in GB Patent Application No. 1700534.9 dated Jun. 15, 2017.
Extended Search Report from counterpart European Application No. 18151070.2, dated Apr. 9, 2018, 5 pp.
Intent to Grant dated Sep. 26, 2018, from counterpart European Application No. 18151070.2, 43 pp.

* cited by examiner

METHOD OF MEASURING FAN BLADE PICTURE FRAME WIDTH

CROSS-REFERENCE TO RELATED APPLICATION

This specification is based upon and claims the benefit of priority from British Patent Application No. GB 1700534.9, filed on 12 Jan. 2017, the entire contents of which are incorporated herein by reference.

BACKGROUND OF THE DISCLOSURE

The present disclosure relates to a method of measuring the bonded perimeter width of a hollow component and particularly, but not exclusively, to a method of measuring the bonded perimeter width of a hollow fan blade for a gas turbine engine.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

The fan blades may be formed as hollow structural components comprising two metal sheet skins with a shaped core portion. The skins and core portion may be brazed together or may be diffusion bonded and superplastically formed.

In such blade constructions, the two blade skins are bonded to one another around a perimeter of the blade. This bonded region is sometimes colloquially referred to as a picture frame, and the width of the bonded region, in a direction normal to the edge, is sometimes colloquially referred to as the picture frame width. This is illustrated in FIG. 2 by the line B-C.

This picture frame width is an important parameter for the structural integrity of the formed fan blade because it provides a measure of the strength of the joint between the two blade skins.

The measurement of the picture frame width (the distance B-C in FIG. 2) is carried out manually using an ultrasonic probe. For each blade a series of measurement points are marked around the perimeter of the blade, and at each of the points a section line is drawn onto the blade surface in a direction normal to the blade edge. This is illustrated in FIG. 3.

At each of these section lines, the ultrasonic probe is traversed along the line from the edge of the blade towards the interior of the blade until the signal from the ultrasonic probe indicates that the interior edge of the cavity has been found. This point is marked on the blade surface and its distance from the edge is recorded.

This technique is time consuming, taking approximately 15 to 20 minutes for each blade.

The use of an existing non-contacting ultrasonic skin thickness measurement system has been proposed, as illustrated in FIG. 4. However, while this system can reliably detect the internal cavity edge, corresponding to point A of FIG. 4, it is unable to detect the external edge, corresponding to point D of FIG. 4.

This is because there is no ultrasonic signal in the region F-D due to the curved surface of the blade skin. Consequently, the blade skin thickness disappears at the point F and the distance F-D is not available.

BRIEF SUMMARY OF DISCLOSURE

According to a first aspect of the present disclosure there is provided a method of measuring the bonded perimetric width of a hollow component, the hollow component comprising a first panel and a second panel, the first and second panels being bonded to one another around their respective perimeters, the perimetric width being the width of the bonded portion joining the first panel to the second panel, the method comprising the steps of:
  (i) providing a hollow component;
  (ii) positioning an ultrasonic probe over an outwardly facing surface of the first panel;
  (iii) positioning an auxiliary plate against an outwardly facing surface of the second panel, the auxiliary plate being substantially normal to a beam axis of the probe;
  (iv) defining a probe path extending from a centre portion of the hollow component to beyond a perimetric edge of the hollow component, the probe path extending either side of the perimetric width, the probe path being substantially normal to the perimetric edge;
  (v) traversing the ultrasonic probe along the probe path, the ultrasonic probe directing an ultrasonic beam towards the outwardly facing surface of the first panel, and sensing a return signal from the ultrasonic beam, the return signal being indicative of a thickness of the hollow component at each of a plurality of points;
  (vi) determining a first end position for the perimetric width at the perimetric edge, the first end position being the position of a first step change in the return signal caused by the ultrasonic beam impinging on the auxiliary plate;
  (vii) determining a second end position for the perimetric width, the second end position being distal to the perimetric edge, the second end position being the position of a second step change in the return signal caused by the ultrasonic beam impinging on an interior volume of the hollow component;
  (viii) calculating the perimetric width being a distance between the first end position and the second end position; and
  (ix) repeating steps (iv) to (viii) along the perimetric edge of the hollow component.

The use of an auxiliary plate positioned against an outwardly facing surface of the second panel enables an ultrasonic probe moving across an outwardly facing surface of the first panel, i.e. the opposing face of the hollow component, to accurately detect a perimetric edge position of the hollow component.

This is achieved by monitoring the return signal from the ultrasonic probe and using the step change in this return signal resulting from the ultrasonic sensor moving across the perimetric edge.

The use of an auxiliary plate is simple and cost effective and enables the measurement of the perimetric edge width to be automated. This makes the whole process quicker, more reliable (due to the elimination of manual measurements) and so more desirable for a user.

Optionally, the auxiliary plate extends along the perimetric edge of the hollow component.

By extending the auxiliary plate along the entire length of the perimetric edge of the hollow component, it becomes possible to measure the perimetric edge width of the hollow component along the entire perimeter of the hollow component without the need to reposition the auxiliary plate for each successive measurement. This makes the method more time efficient for a user.

Optionally, the auxiliary plate is profiled to conform to the second panel.

By profiling the auxiliary plate to conform to the surface geometry of the second panel, the positioning of the auxiliary plate against the second panel becomes easier and quicker for a user because of the conformal geometry of the interface between the second panel and the auxiliary plate.

Optionally, the auxiliary plate is fastened to the hollow component by a magnetic fastener.

The use of magnetic fastening elements to attach the auxiliary plate to the hollow component makes the attachment quicker and easier for a user.

Optionally, the auxiliary plate has a thickness of approximately 2 mm.

Forming the auxiliary plate from a material having a thickness of approximately 2 mm ensures that the ultrasonic probe can reliably and repeatably sense the presence of the auxiliary plate and hence the perimetric edge of the hollow component, while at the same time ensuring that the auxiliary plate is light enough to be manually handled so as to be positioned against the hollow component.

Optionally, the hollow component is a fan blade for a gas turbine engine.

The determination of perimetric edge width is an important measurement parameter for gas turbine fan blades that have been manufactured by attaching first and second skins on either side of a core material.

According to a second aspect of the present disclosure there is provided a computer program that, when read by a computer, causes performance of the method according to the first aspect.

The use of the auxiliary plate enables the method according to the first aspect to be completely automated. For example, the ultrasonic probe may be controlled by a multi-axis robotic actuator, and the hollow component together with the auxiliary plate may be positioned on a fixture. The robotic actuator may then be controlled by a computer program that is read by a computer. Such an arrangement would make the determination of perimetric edge width for a hollow component both quick and straightforward for a user.

According to a third aspect of the present disclosure there is provided a non-transitory computer readable storage medium comprising computer readable instructions that, when read by a computer, cause performance of the method according to the first aspect.

According to a fourth aspect of the present disclosure there is provided a signal comprising computer readable instructions that, when read by a computer, cause performance of the method according to the first aspect.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE DRAWINGS

Figure 1:
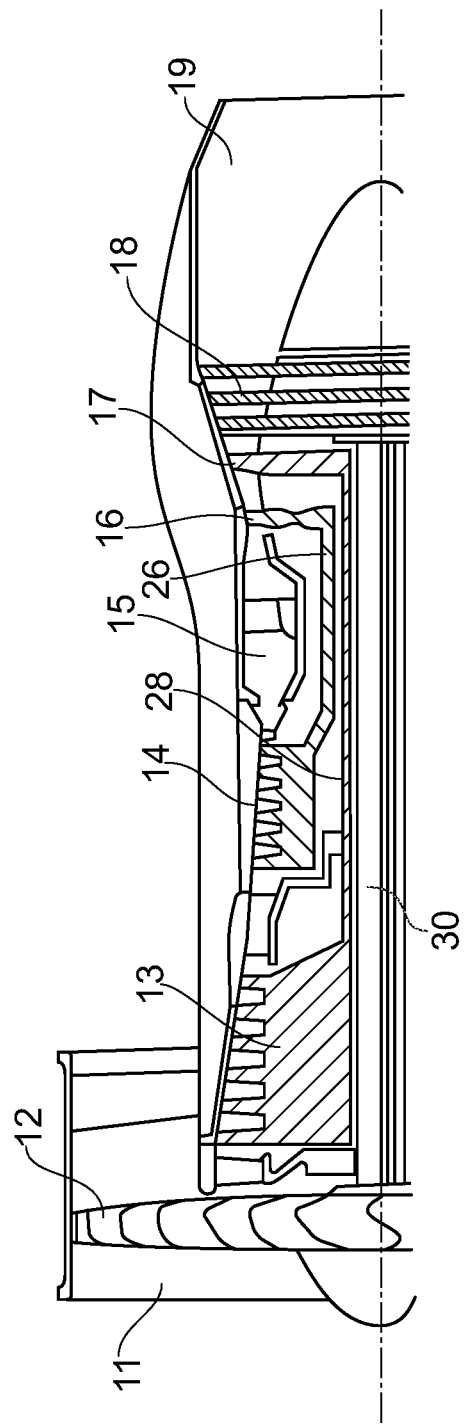
FIG. 1 shows a schematic part-sectional view of a turbofan gas turbine engine incorporating a fan assembly comprising a plurality of hollow fan blades each of which has a perimetric edge width that may be measured by a method according to a first aspect of the present disclosure.
Figure 2:
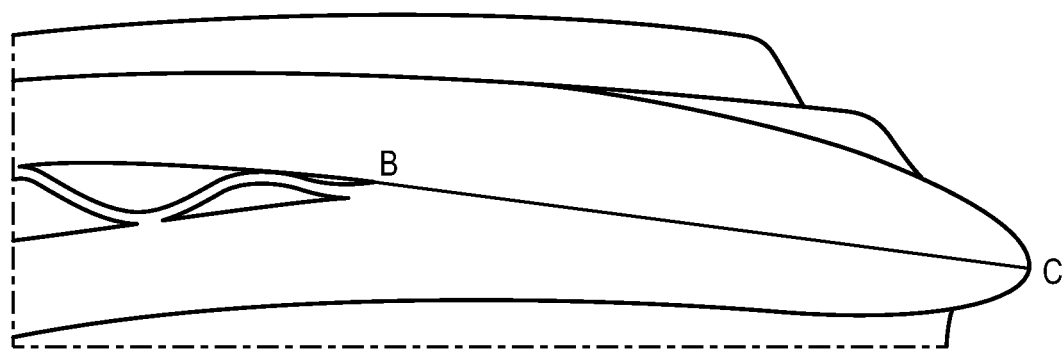
FIG. 2 shows a sectional view of a perimetric edge of a hollow fan blade.
Figure 3:
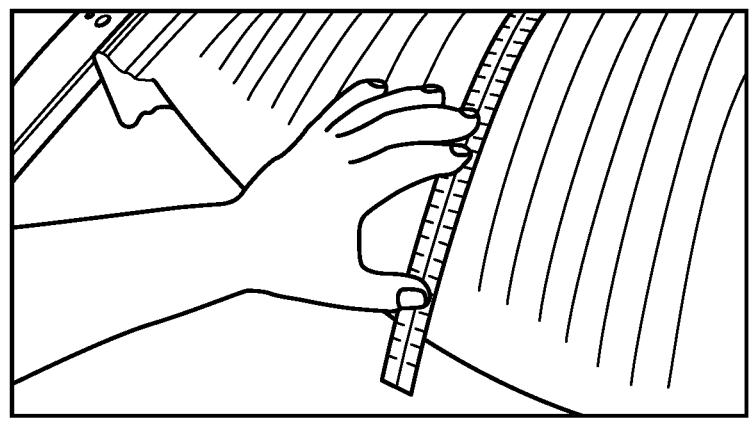
FIG. 3 shows a step in the prior art technique of measuring a perimetric edge width of a hollow component.
Figure 4:
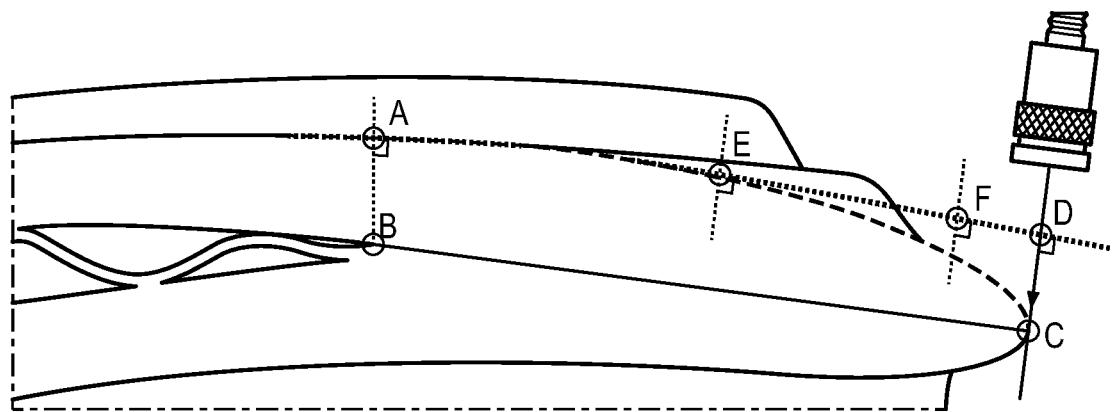
FIG. 4 shows a schematic view of an alternative prior art technique for measuring skin thickness of a hollow component, but that cannot be used for measuring perimetric edge width of a hollow component.
Figure 5:
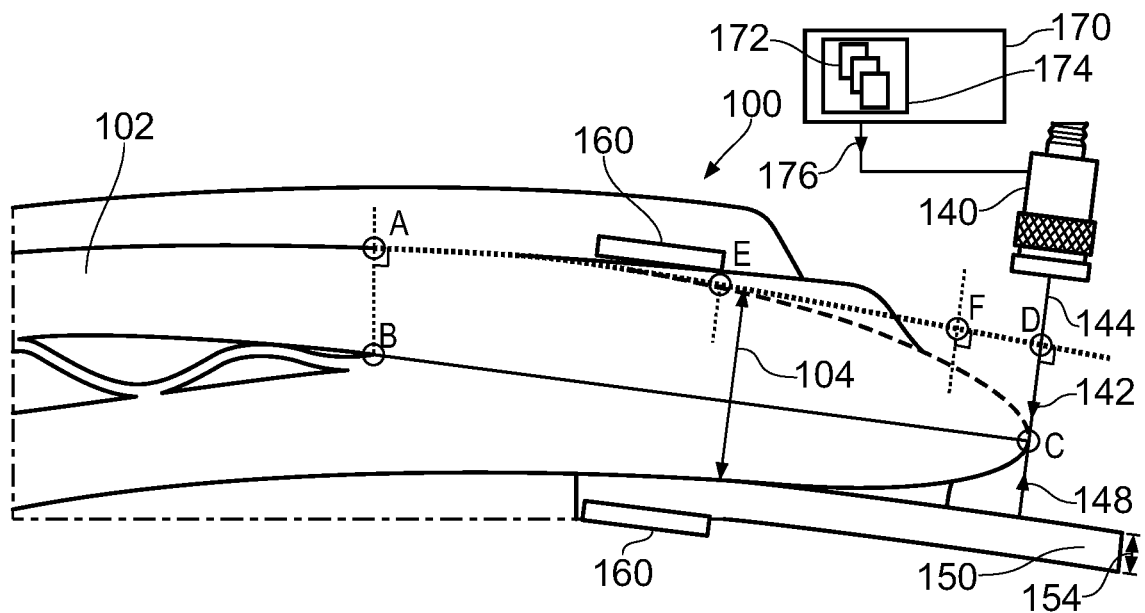
FIG. 5 shows a schematic view of a method for measuring perimetric edge width of a hollow component according to a first aspect of the present disclosure.
Figure 6:
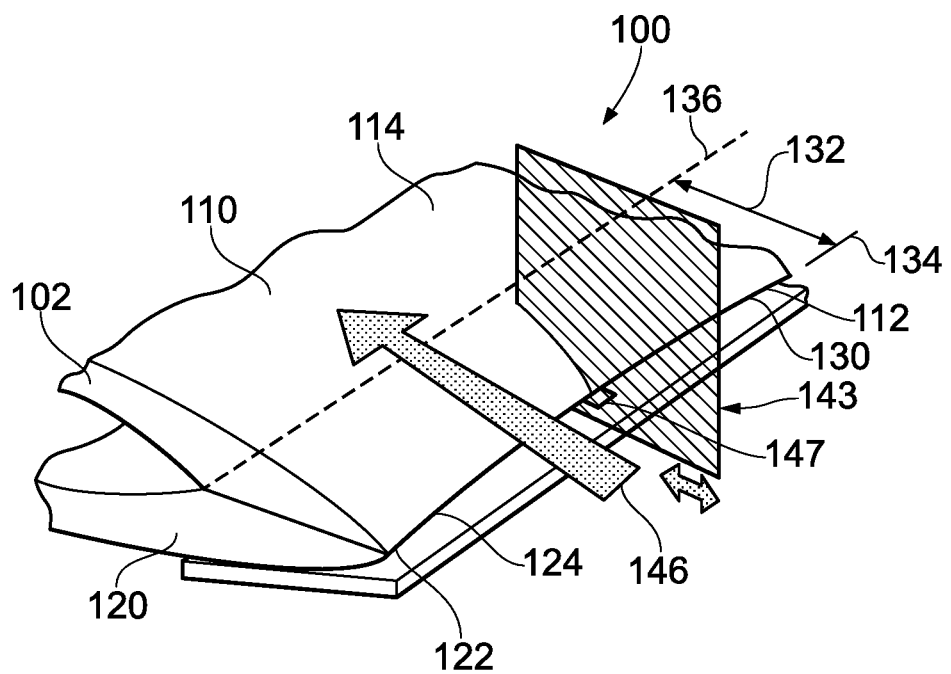
FIG. 6 shows a partial perspective view of a perimetric edge of a hollow component to which the method of the present disclosure may be applied.

Referring to FIGS. 5 and 6, a hollow component, having a perimetric edge width that is to be measured by a first embodiment of the disclosure, is designated generally by the reference numeral 100.

In the detailed description that follows the hollow component 100 takes the form of a diffusion bonded and superplastically formed fan blade for a turbofan gas turbine engine 10. However, the method of the present disclosure is equally applicable to other hollow components having two opposing skins or panels enclosing a hollow centre portion and having a perimetric edge width being the width of the joint between the two panels.

The hollow fan blade 100 comprises a first panel 110, a second panel 120, and a centre portion 102 being hollow.

The first panel 110 has a perimeter 112 and an outwardly facing surface 114. Likewise, the second panel 120 has a perimeter 122 and an outwardly facing surface 124.

The first panel 110 is joined to the second panel 120 at their respective perimeters 112,114 thereby defining a perimetric edge 130 to the hollow fan blade 100. The joint at this perimetric edge 130 has a thickness 104. The joint at the perimetric edge 130 also has a width that is defined as a perimetric edge width 132.

An auxiliary plate 150 is attached to the outwardly facing surface 124 of the second panel 120 by magnetic fasteners 160. The auxiliary plate 150 has a thickness 154. In the present arrangement, the thickness 154 of the auxiliary plate 150 is 2 mm. The auxiliary plate 150 extends along the perimetric edge 130 of the hollow component 100.

The auxiliary plate 150 extends beyond the perimetric edge 130 of the hollow component 100 in a direction normal to the perimetric edge 130. The auxiliary plate 150 is arranged to follow the contour of the outwardly facing surface 124 of the second panel 120.

In an alternative arrangement of the disclosure, an auxiliary plate 250 may be formed to correspond to the entire outwardly facing surface 124 of the second panel 120. In other words, the auxiliary plate 250 is conformal to the second panel 120. This arrangement provides for the auxiliary plate 250 to extend around the entire periphery of the hollow component 100 at which the perimetric edge width 132 is to be measured.

An ultrasonic probe 140 is positioned adjacent to the first panel 110 at a distance from the outwardly facing surface 114 of the first panel 110. The ultrasonic probe 140 emits an ultrasonic beam 142. The ultrasonic beam 142 is oriented in a plane 143 that is substantially normal to the outwardly facing surface 114 of the first panel 110.

In the method of the disclosure, the ultrasonic probe 140 is traversed in a direction defined as a probe path 146. The probe path 146 is substantially normal 147 to the perimetric edge 130. The ultrasonic beam 142 is emitted towards the outwardly facing surface 114 of the first panel 110, a return signal 148 is returned to the ultrasonic probe 140 by the hollow component 100 and auxiliary plate 150.

Movement of the ultrasonic probe 140 is controlled by a computer program 172 that is arranged to operate on a computer 170. The computer program 172 may be stored on a computer readable storage medium 174. Operation of the computer program 172 on the computer 170 results in the generation of a signal 176 that is directed to the ultrasonic probe 140 to produce the movement of the ultrasonic probe 140.

Figure 7:
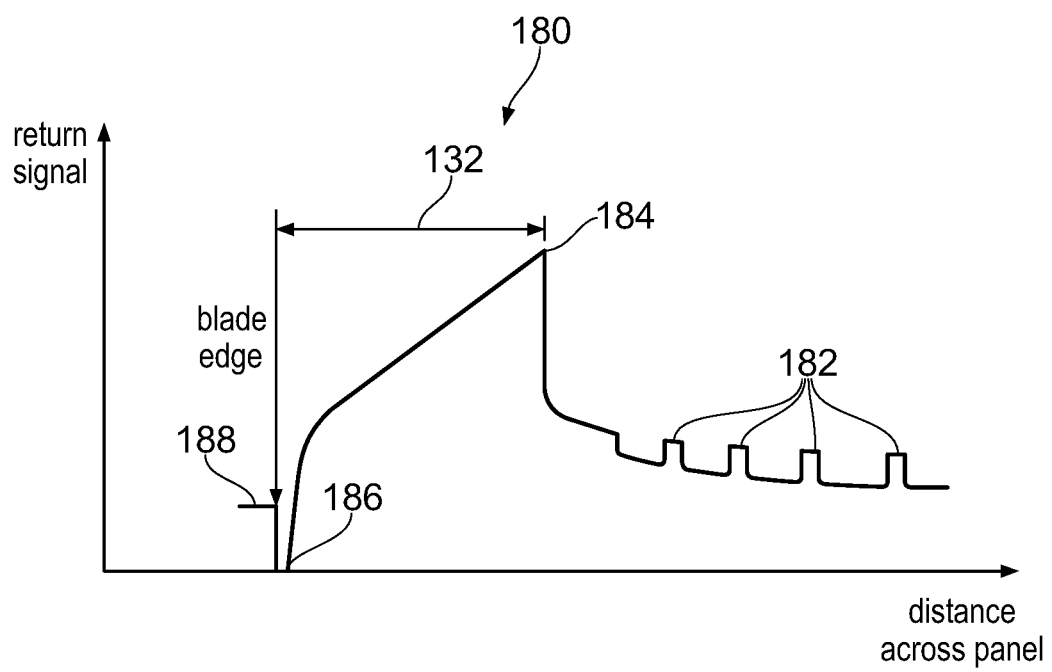
FIG. 7 shows a sample return signal from the ultrasonic probe of the arrangement of FIG. 5, illustrating the detection of a single perimetric edge.
Figure 8:
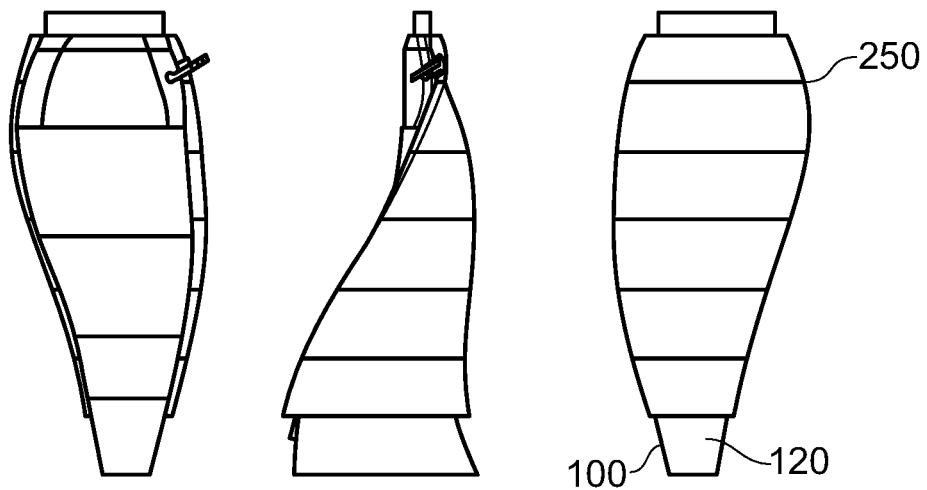
FIG. 8 shows front, side and rear views of an auxiliary plate that has been formed to conform to the outwardly facing surface of the second panel of the hollow component illustrated in FIGS. 5 and 6.

As the ultrasonic probe 140 is traversed across the width of the perimetric edge 130, across the perimetric edge 130, and over the auxiliary plate 150, a return signal 148 is generated and captured. FIG. 7 shows a sample portion of a trace 180 corresponding to the return signal 148 corresponding to the perimetric edge width 132 and the auxiliary plate 150 region.

Considering the signal trace 180 of FIG. 7, moving from right to left the signal trace 180 shows four discrete peaks 182, each corresponding to an internal feature (not shown) of the hollow component 100. These hollow features may be ribs or some other structural feature.

Continuing from right to left, the return signal trace 180 then increases sharply to a maximum value 184 that corresponds to the second end position 136 of the perimetric edge 130.

Continuing from right to left, the return signal trace 180 decreases from the maximum value 184 to a minimum value 186. From this minimum value 186 the return signal trace 180 exhibits a step increase to a constant value 188. This constant value portion 188 represents the presence of the auxiliary plate 150. The right hand most edge of this constant value portion 188 corresponds to the first end position 134 of the perimetric edge 130.

The distance between the maximum value 184 and the constant value portion 188, corresponds to the distance between the first end position 134 and the second end position 136, which equals the perimetric edge width 132.

In a production environment the ultrasonic probe 140 would traverse across the entire width of the hollow component 100 and can provide for the determination of the perimetric edge width 132 on opposing perimetric edges 130 of the hollow component 100. A sample of such a signal trace 190 is provided at FIG. 9.

Figure 9:
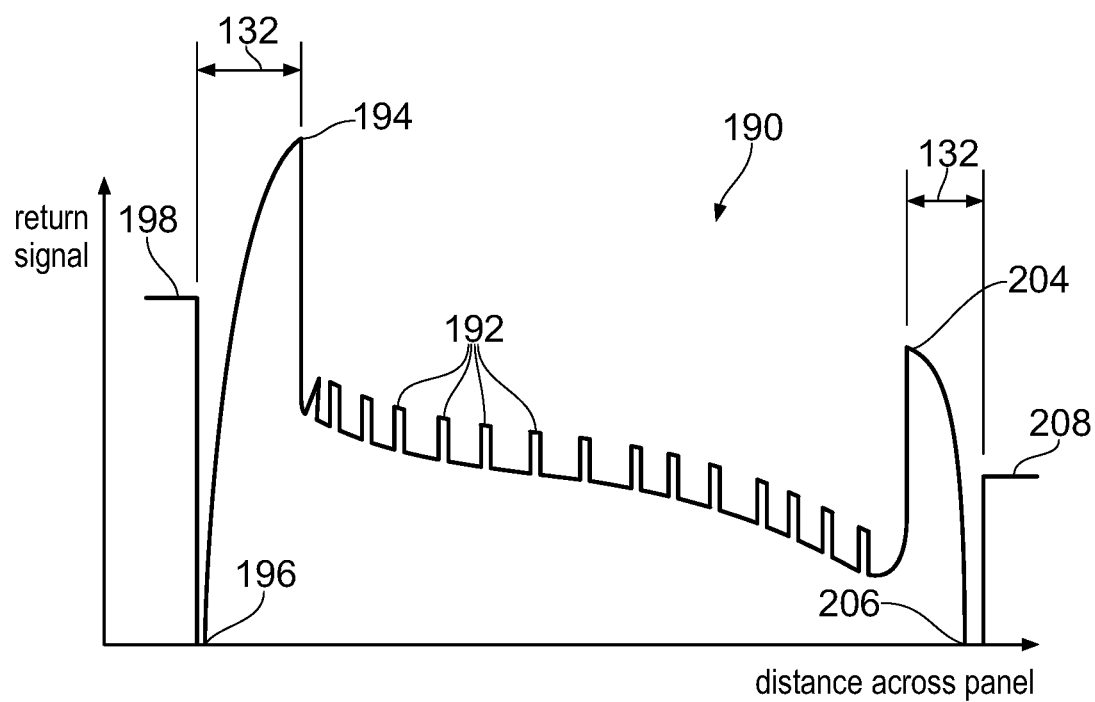
FIG. 9 shows a sample return signal from the ultrasonic probe of the arrangement of FIG. 5, illustrating the detection of the perimetric edges on each opposing side of a hollow component.

With reference to the signal trace 190 shown in FIG. 9, the intermediate peaks 192 represent internal features of the hollow component 100. These hollow features may be ribs or some other structural feature.

Starting at the rightmost edge the constant value portion 208 represents the auxiliary plate 150. Continuing from right to left, the signal trace 190 decreases to a minimum value 206 and then increases to a maximum value 204, the maximum value 204 corresponds to the second end position 136 of the perimetric edge 130 at a first side of the hollow component 100.

Continuing from right to left, the intermediate peaks 192 represent internal features of the hollow component 100. These hollow features may be ribs or some other structural feature.

The return signal trace 190 then increases sharply to a maximum value 194 that corresponds to the second end position 136 of the perimetric edge 130 at a second opposite side of the hollow component 100.

Continuing from right to left, the return signal trace 190 decreases from the maximum value 194 to a minimum value 196. From this minimum value 196 the return signal trace 190 exhibits a step increase to a constant value 198. This constant value portion 198 represents the presence of the auxiliary plate 150. The right hand most edge of this constant value portion 198 corresponds to the first end position 134 of the perimetric edge 130.

The distance between the maximum value 194 and the constant value portion 198, corresponds to the distance between the first end position 134 and the second end position 136, which equals the perimetric edge width 132.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A method of measuring the bonded perimetric width of a hollow component, the hollow component comprising a first panel and a second panel, the first and second panels being bonded to one another around their respective perimeters, the perimetric width being the width of the bonded portion joining the first panel to the second panel, the method comprising the steps of:
- (i) providing a hollow component;
- (ii) positioning an ultrasonic probe over an outwardly facing surface of the first panel;
- (iii) positioning an auxiliary plate against an outwardly facing surface of the second panel, the auxiliary plate being substantially normal to a beam axis of the probe;
- (iv) defining a probe path extending from a centre portion of the hollow component to beyond a perimetric edge of the hollow component, the probe path extending either side of the perimetric width, the probe path being substantially normal to the perimetric edge;
- (v) traversing the ultrasonic probe along the probe path, the ultrasonic probe directing an ultrasonic beam towards the outwardly facing surface of the first panel, and sensing a return signal from the ultrasonic beam, the return signal being indicative of a thickness of the hollow component at each of a plurality of points;
- (vi) determining a first end position for the perimetric width at the perimetric edge, the first end position being the position of a first step change in the return signal caused by the ultrasonic beam impinging on the auxiliary plate;
- (vii) determining a second end position for the perimetric width, the second end position being distal to the perimetric edge, the second end position being the position of a second step change in the return signal caused by the ultrasonic beam impinging on an interior volume of the hollow component;
- (viii) calculating the perimetric width being a distance between the first end position and the second end position; and
- (ix) repeating steps (iv) to (viii) along the perimetric edge of the hollow component.

2. The method as claimed in claim 1, wherein the auxiliary plate extends along the perimetric edge of the hollow component.

3. The method as claimed in claim 1, wherein the auxiliary plate is profiled to conform to the second panel.

4. The method as claimed in claim 1, wherein the auxiliary plate is fastened to the hollow component by a magnetic fastener.

5. The method as claimed in claim 1, wherein the auxiliary plate has a thickness of approximately 2 mm.

6. The method as claimed in claim 1, wherein the hollow component is a fan blade for a gas turbine engine.

7. A computer program that, when read by a computer, causes performance of the method as claimed in claim 1.

8. A non-transitory computer readable storage medium comprising computer readable instructions that, when read by a computer, perform a method of:
measuring the bonded perimetric width of a hollow component, the hollow component comprising a first panel and a second panel, the first and second panels being bonded to one another around their respective perimeters, the perimetric width being the width of the bonded portion joining the first panel to the second panel, the method comprising the steps of:
- (i) providing a hollow component;
- (ii) positioning an ultrasonic probe over an outwardly facing surface of the first panel;
- (iii) positioning an auxiliary plate against an outwardly facing surface of the second panel, the auxiliary plate being substantially normal to a beam axis of the probe;
- (iv) defining a probe path extending from a centre portion of the hollow component to beyond a perimetric edge of the hollow component, the probe path extending either side of the perimetric width, the probe path being substantially normal to the perimetric edge;
- (v) traversing the ultrasonic probe along the probe path, the ultrasonic probe directing an ultrasonic beam towards the outwardly facing surface of the first panel, and sensing a return signal from the ultrasonic beam, the return signal being indicative of a thickness of the hollow component at each of a plurality of points;
- (vi) determining a first end position for the perimetric width at the perimetric edge, the first end position being the position of a first step change in the return signal caused by the ultrasonic beam impinging on the auxiliary plate;
- (vii) determining a second end position for the perimetric width, the second end position being distal to the perimetric edge, the second end position being the position of a second step change in the return signal caused by the ultrasonic beam impinging on an interior volume of the hollow component;
- (viii) calculating the perimetric width being a distance between the first end position and the second end position; and
- (ix) repeating steps (iv) to (viii) along the perimetric edge of the hollow component.

9. A signal comprising computer readable instructions that, when read by a computer, cause performance of a method of measuring the bonded perimetric width of a hollow component, the hollow component comprising a first panel and a second panel, the first and second panels being bonded to one another around their respective perimeters, the perimetric width being the width of the bonded portion joining the first panel to the second panel, the method comprising the steps of:
- (i) providing a hollow component;
- (ii) positioning an ultrasonic probe over an outwardly facing surface of the first panel;
- (iii) positioning an auxiliary plate against an outwardly facing surface of the second panel, the auxiliary plate being substantially normal to a beam axis of the probe;
- (iv) defining a probe path extending from a centre portion of the hollow component to beyond a perimetric edge of the hollow component, the probe path extending either side of the perimetric width, the probe path being substantially normal to the perimetric edge;
- (v) traversing the ultrasonic probe along the probe path, the ultrasonic probe directing an ultrasonic beam towards the outwardly facing surface of the first panel, and sensing a return signal from the ultrasonic beam, the return signal being indicative of a thickness of the hollow component at each of a plurality of points;
- (vi) determining a first end position for the perimetric width at the perimetric edge, the first end position being the position of a first step change in the return signal caused by the ultrasonic beam impinging on the auxiliary plate;
- (vii) determining a second end position for the perimetric width, the second end position being distal to the perimetric edge, the second end position being the position of a second step change in the return signal caused by the ultrasonic beam impinging on an interior volume of the hollow component;
- (viii) calculating the perimetric width being a distance between the first end position and the second end position; and (ix) repeating steps (iv) to (viii) along the perimetric edge of the hollow component.

\* \* \* \* \*